UNITED STATES PATENT OFFICE.

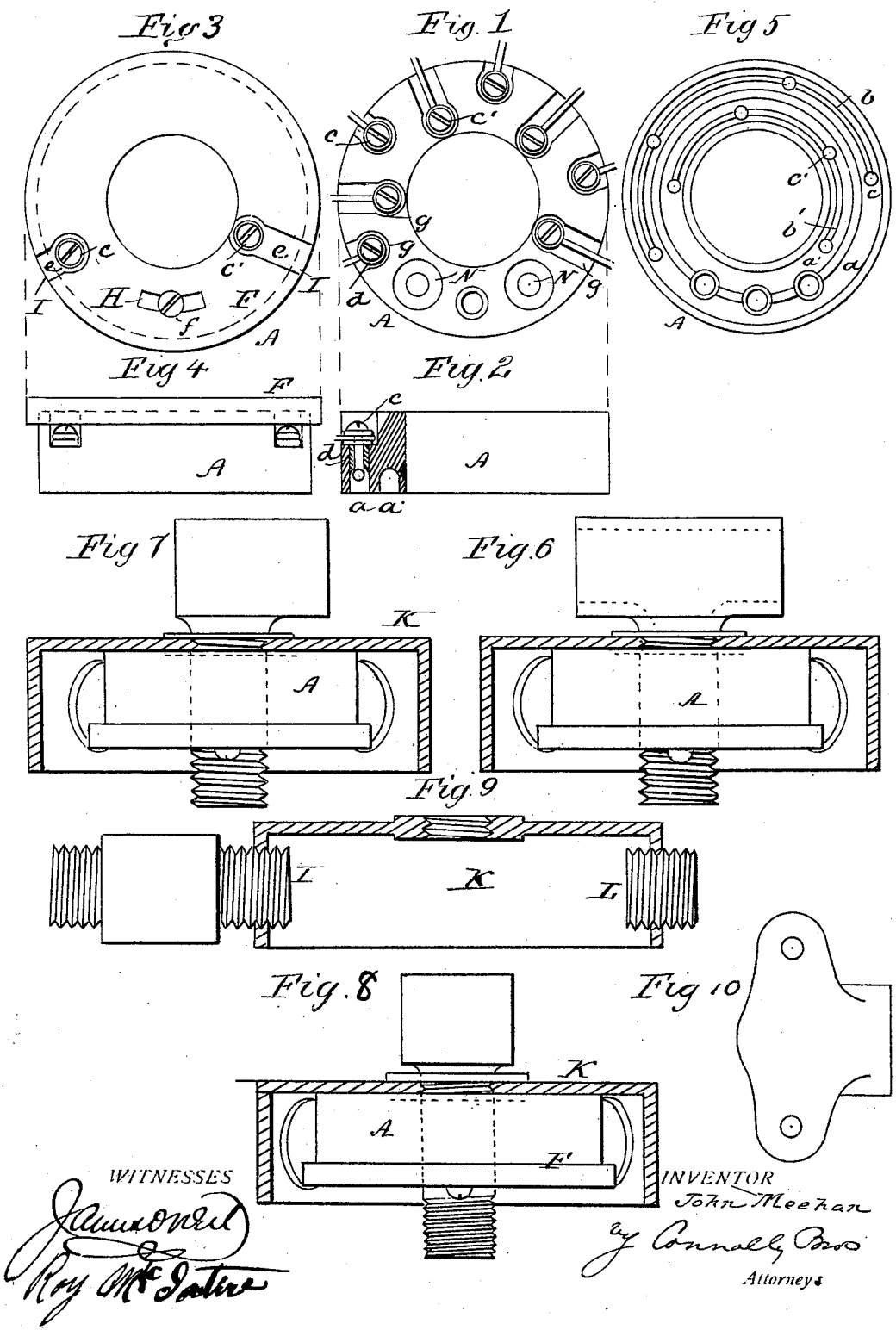

JOHN MEEHAN, OF BROOKLYN, NEW YORK.

JUNCTION-BOX AND ADAPTER FOR ELECTRICAL INSTALLATION.

SPECIFICATION forming part of Letters Patent No. 679,057, dated July 23, 1901.

Application filed May 16, 1901. Serial No. 60,513. (No model.)

*To all whom it may concern:*

Be it known that I, JOHN MEEHAN, a citizen of the United States, residing at 290½ Fifty-second street, Brooklyn, in the county of Kings and State of New York, have invented certain new and useful Improvements in Junction-Boxes and Adapters for Electrical Installation; and I do hereby declare the following to be a full, clear, and exact description of the invention, such as will enable others skilled in the art to which it appertains to make and use the same.

This invention has relation to adapters and junction-boxes for use in the installation of electric wires in buildings.

The object of the invention is to overcome a long-felt want in the wiring of buildings to be lighted by electric lamps—that is, to keep the work of the wiremen and fixturemen entirely separate. Under the methods of installation heretofore in use the wiremen's work has never been finished until the fixturemen have attached the fixtures. The wiremen and fixturemen have been compelled to practically work together, thus entailing much loss of time and unsatisfactory results.

The purpose of the invention constituting the subject of this application is to render two classes of workmen entirely independent of each other in the performance of their work, the wires being so installed and their terminals so arranged that after the wiremen have fully tested them, so as to avoid imperfections and grounding of wires, the fixturemen may without disturbing the work of the wiremen attach the fixtures and complete the installation without meeting with the difficulties and annoyances heretofore experienced, where, as has been the custom, the wires have been allowed to hang outside the outlets in an unfinished condition.

According to my invention when the adapter is in place and within the junction-box the wiremen will be enabled to properly ensemble the wires, so as to complete the circuits, and when a suitable cover is put on the adapter the work is complete, grounding prevented, and the whole capable of being seen by the inspector, who can at a glance see whether the work has been done properly or improperly. After the adapter has been thus arranged it is ready for the fixtureman, who connects his wires to terminal screws and screws the fixture to its place, with a suitable insulating-joint arranged in the usual manner.

In the accompanying drawings, illustrating my invention, Figure 1 is a plan view of the adapter. Fig. 2 is an elevation, partly in section, of the same. Fig. 3 is a plan view of the adapter with its cover in place. Fig. 4 is an elevation of the adapter with its cover. Fig. 5 is a plan view of the reverse side of the adapter. Fig. 6 is a sectional view of the junction-box, showing the adapter inside with drop T. Fig. 7 is a sectional view of the junction-box, showing adapter with drop extension. Fig. 8 is a section of junction-box, showing adapter with drop L. Fig. 9 is a section of junction-box, showing union-joint connecting conduit-pipes to junction-box. Fig. 10 is a top view of drop L.

The principal feature of this invention is the adapter A, which consists, preferably, of an annular block of porcelain formed on its reverse side with two circular grooves $a$ $a'$ to receive the conduit-wires $b$ $b'$, which are arranged and adapted to suit any terminal or electric switch. After the wires are arranged in the grooves the latter may be filled with cement to make the wires secure. Attached to these wires at intervals are the connecting-screws $c$ $c'$, &c., which pass through holes in the adapter, the said holes having inserted therein threaded metallic bushings $d$. Two of these screws are intended for the connection to the adapter of the fixture-wires leading to the lamps on the fixture, and these two screws are accessible through two slots $e$ $e$ in the cover F of the adapter, which enables the fixtureman to attach the fixture-wires without removing the cover of the adapter. The adapter is formed with recesses $g$ $g$ on its face to receive the heads of the screws forming the terminals of the several connections and to allow of the passage of the various wires to be attached to said screws through the sides of the adapter. Two of these screws are the connectors to the adapter-wires of the incoming wires passing through the conduit-pipes, four are for branch connections, and two for fixture-wires. The adapter is provided with a flanged cap or cover F, which is secured in place by a screw ƒ passing through a segmental slot H in the cover F. To allow of easy access to the screws forming the terminals for the connection of the fixture-wires, the cover F is formed with the radial recesses I I', so that the fixtureman in attaching the ends of the fixture-wires has no occasion to take the cover off the adapter.

The adapter is designed and intended to be inserted in a junction-box K, into which are screwed the wire-conduit pipes L L and the T, L, or other drop connection for the gas-fixtures. Several forms of these drop connections are shown in the drawings, and it will be observed that these, as well as the wire-conduit pipes, are screwed into the junction-box K K.

The curved lines on the right and left of the adapter A in Figs. 6, 7, and 8 represent the ends of the incoming conduit-pipes.

The adapter is secured inside of the junction-box by the screws N N.

The adapter is intended to be a permanent attachment, which can be inspected without trouble and when so attached to the junction-box will be a guarantee that the work is well done and an absolute preventative against grounded wires and wrong connections in the junction-box. When installed by the wireman, it never requires to be disturbed by the fixtureman to get his connections. It saves the trouble of scraping, soldering, and tapping the same and disposes of all trouble made by the fixtureman in making wrong connections.

Having described my invention, I claim—

1. The adapter for electrical installation consisting of the annular block of porcelain A having the circular grooves $a\ a'$ in its reverse side and the radial recesses $g\ g$ in its face, substantially as described.

2. The combination with the adapter A having the grooves $a\ a'$ in its reverse side and the recesses $g\ g$ in its face of the cap F adapted to be secured to said adapter and having the fixture-wire recesses I I' substantially as described.

3. The combination with the adapter A having grooves $a\ a'$ in its reverse side and recesses $g\ g$ in its face of the cap F and the junction-box K adapted for the connection thereto of the electric-wire conduits and drop connections for gas-fixtures, substantially as described.

In testimony whereof I affix my signature in presence of two witnesses.

JOHN MEEHAN.

Witnesses:
    JAMES BEESLEY,
    A. H. PATTERSON.